July 11, 1933. G. K. VIALL 1,918,220
STRAIN EQUALIZER FOR MULTIPLE CABLES
Filed Sept. 17, 1930 3 Sheets-Sheet 3
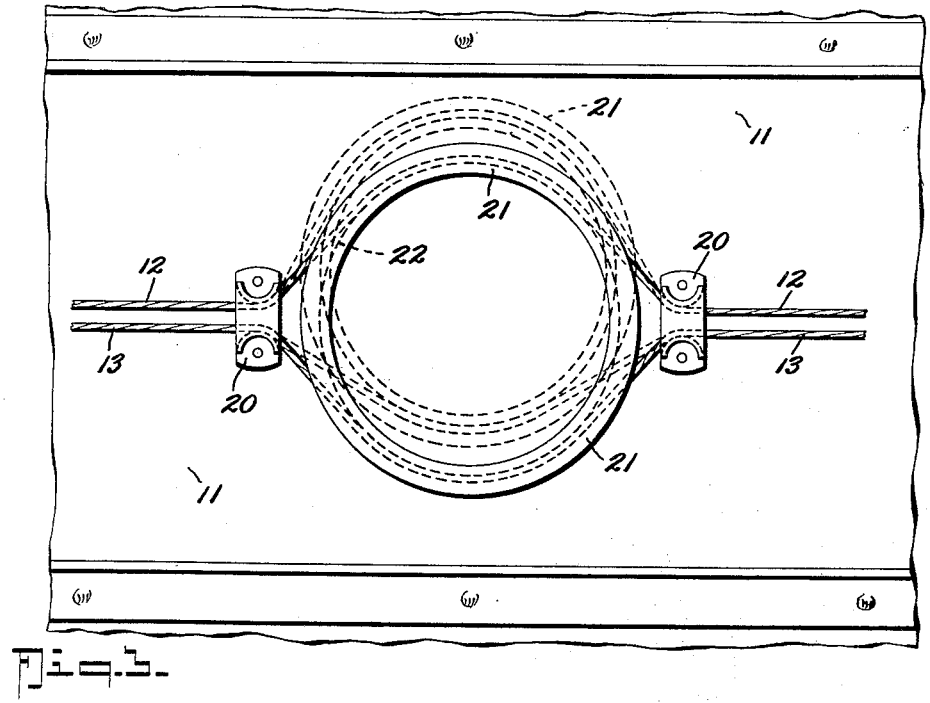
Fig. 3.
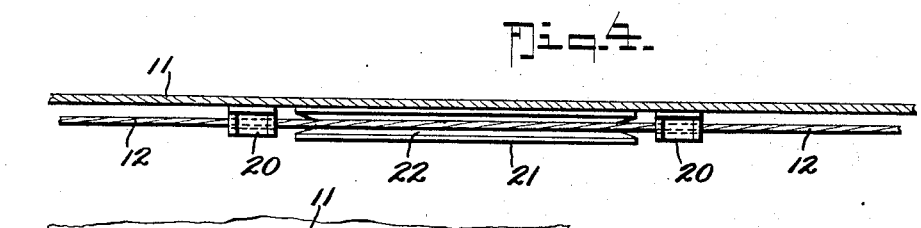
Fig. 4.
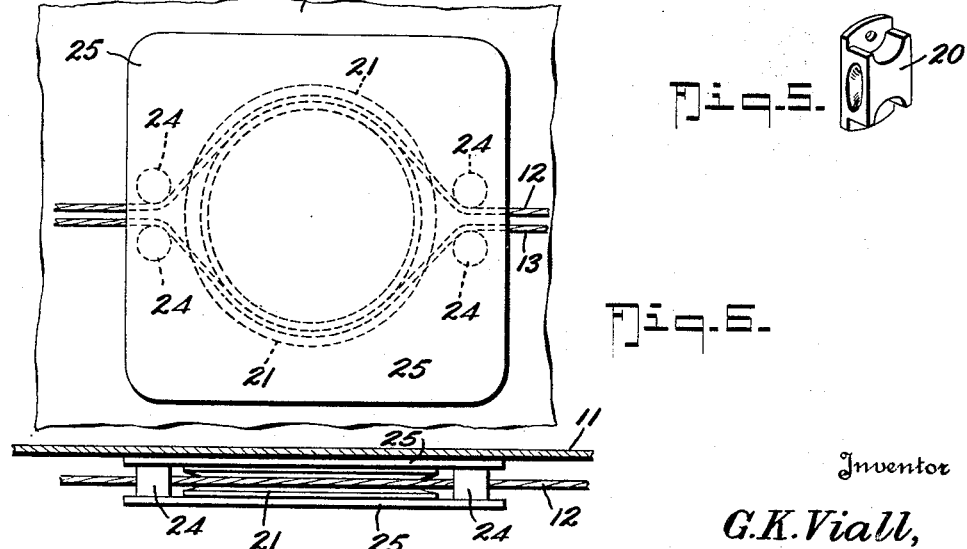
Fig. 5.
Fig. 6.
Fig. 7.
Inventor
G. K. Viall,
By Barker & Collings
Attorneys Patented July 11, 1933

1,918,220

UNITED STATES PATENT OFFICE

GEORGE K. VIALL, OF MILWAUKEE, WISCONSIN, ASSIGNOR TO CHAIN BELT COMPANY, OF MILWAUKEE, WISCONSIN, A CORPORATION OF WISCONSIN

STRAIN EQUALIZER FOR MULTIPLE CABLES

Application filed September 17, 1930. Serial No. 482,639.

This invention relates to strain equalizers for multiple cables and the like, and has for one of its objects to provide a device of this character which will be simple in construction, comparatively inexpensive to manufacture and more efficient in use than those which have been heretofore proposed.

While susceptible to wide use the present invention has been primarily designed for use, and is here illustrated in connection, with the skip cables of concrete mixing machines, more especially those of the paving type. In apparatus of this character it is customary to provide a charging skip which is raised and lowered to and from drum-charging position by means of a cable, the mid-portion of which passes under or is secured to the skip and the ends of which are secured to and wound around cable drums which are ordinarily power operated. It was the former practice to only employ a single cable, but experience has shown the desirability of providing two or more cables in as much in the past serious accidents have some times occurred as a result of the breaking of a single cable which allowed the skip to fall from a considerable height. It is becoming more or less common practice therefore to employ two cables disposed substantially parallel to one another, the free ends of each cable being wound upon the cable winding drums and the mid-portions of the cables being passed beneath or secured to the skip. Each cable is ordinarily strong enough to support the skip by itself so that in the event of the breakage of one cable the other will have sufficient strength to take the load and prevent the skip from falling.

In the operation of such double cable skips it is desirable that the load upon the two cables be equalized so that each will bear approximately one half of the strain and to this end various forms of cable equalizers have been introduced. The present invention has for its principal object the provision of such an equalizer, although as above stated it may be employed in an almost unlimited number of other applications.

With the above and other objects in view which will appear as the description proceeds, the invention consists in the novel details of construction and combinations of parts more fully hereinafter disclosed and particularly pointed out in the appended claims.

Referring to the accompanying drawings forming a part of this specification in which like reference characters designate like parts in all the views:—

Figure 3 is an enlarged elevational view of the form of the present invention shown in Figure 1 and as applied directly to the bottom of the skip;

Figure 4 is an edge elevational view of the parts shown in Figure 3, the skip wall being shown in section;

Figure 5 is a detail perspective view of one of the cable guides constituting a portion of the equalizer;

Figure 6 is an enlarged elevational view of the modified form of equalizer shown in Figure 2; and Figure 7 is an edge elevational view of the equalizer shown in Figure 6.

Figure 1:
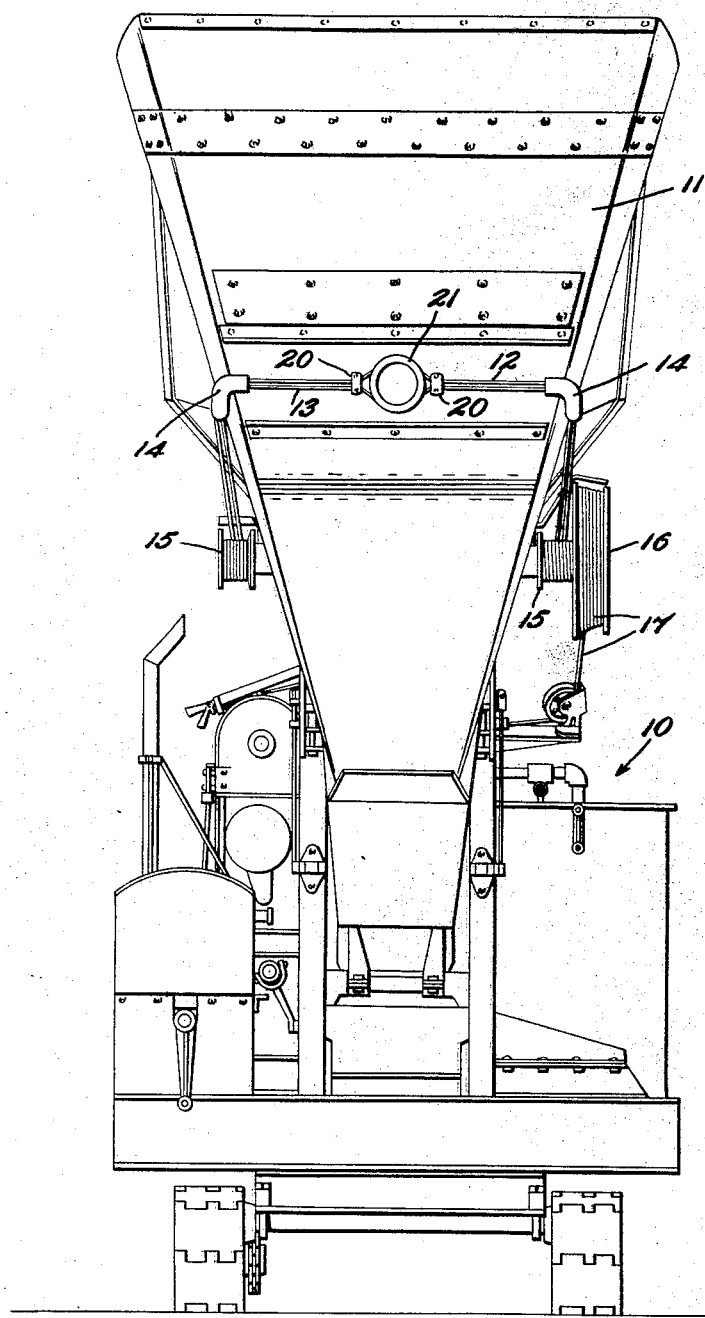
Figure 1 is an end elevational view of a paving concrete mixer with the charging skip elevated and showing a cable equalizer constructed in accordance with the present invention applied to the skip cables beneath the skip.

Referring more particularly to Figures 1, 3, 4 and 5 the concrete mixer 10 is provided with the charging skip 11 which is raised and lowered to and from the charging position shown in Figure 1 by means of the parallel cables 12 and 13, the mid-portions of which pass beneath the bottom of the skip 11 and thence through angular guides 14 up along the sides of the skip to the cable winding drums 15, which may be power driven by means of the usual bull wheel 16 and cable 17 wound thereon, as will be readily understood by those skilled in the art. It has been the prior practice in some instances to rigidly secure the cables such as 12 and 13 to the skip 11, while in other cases the cables are not rigidly secured directly but are free to slide relative to the skip so that some measure of equalization of the strains upon them has been had.

In the present invention the cables are not fastened rigidly to the skip but float thereunder, and in the form of the invention shown in Figure 1 they pass through a pair of cable guide members 20 which are suitably spaced apart and rigidly secured to the bottom of the skip 11 substantially as shown. Positioned between the said guide members 20 is a disc or ring 21, the periphery of which is preferably grooved at 22, see Figures 3 and 4, which groove receives the cables 12 and 13 as will be readily understood from the latter figures. The cables are ordinarily drawn as tight as possible by hand in the assembly of the parts and when the tension upon both cables is the same the disc or ring 21 will occupy substantially the full line position shown in Figure 3. However, if one cable should happen to be a little longer than the other, upon strain being applied to the cables, as during the lifting of the skip, such strain will be first taken by the shorter cable as for example the cable 13 and will be transmitted to the disc or ring 21. This member 21 is not supported by or connected to the skip in any way, but merely floats between the cable guides 20 being wholly supported by the engagement of the cables 12 and 13 with its periphery; and the strain imposed upon the shorter cable 13 moves the ring 21 from the full line position to the dotted line position shown in Figure 3, thereby taking up any slack in the cable 12 and causing it to assume its share of the load. The tension upon the two cables is thus equalized automatically and should there be a further increase or decrease in the tension upon either cable the floating ring 21 will shift in the necessary direction to again equalize the strain upon the two cables. It will be noted that the direction of movement of the disc or ring 21 is substantially transverse to the longitudinal axis of the cable or at least at a substantial angle to said axis.

Figure 2:
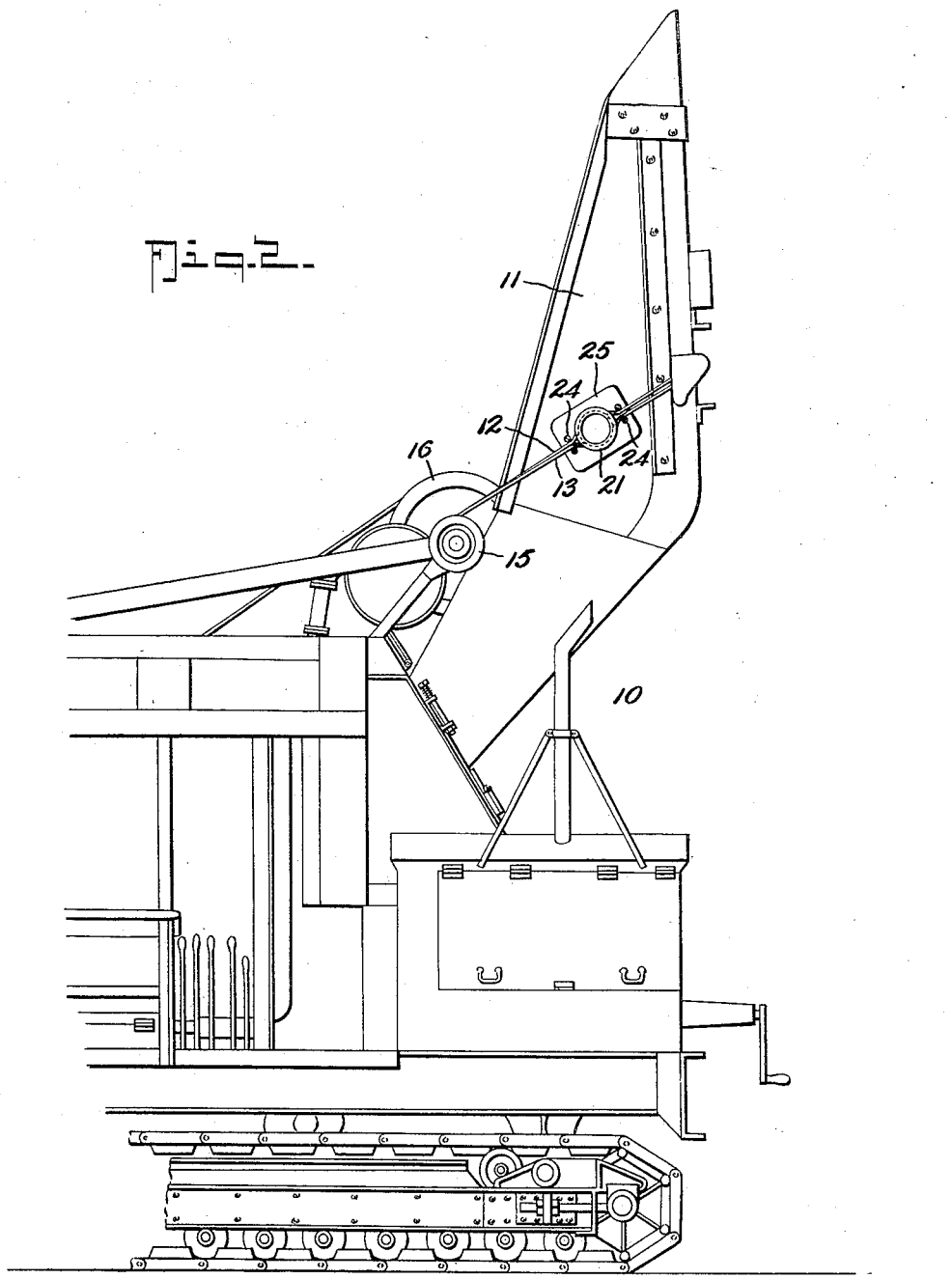
Figure 2 is a side elevational view of a portion of a paving concrete mixer illustrating a slightly modified form of the equalizer applied to the skip cables at the side of the skip.

The form of the invention illustrated in Figures 2, 6 and 7 is substantially the same as that shown in Figures 1, 3 and 4 except that in the modified form, the cable guides 24 instead of being secured directly to the bottom wall of the skip are mounted between a pair of spaced plates 25. These plates are ordinarily not attached to the skip 11 but merely float upon the cables 12 and 13. This form of equalizer is thus self-contained and may be readily applied to any pair of cables where it is desired to equalize the strains upon them, without the necessity of attaching it to any particular part of the machine. The action of the disc or ring 21 in the modified form is, however, the same as that in the preceding form.

It is obvious that those skilled in the art may vary the details of construction as well as the precise arrangement of parts without departing from the spirit of the invention, and therefore it is not wished to be limited to the above disclosure except as may be required by the claims.

What is claimed is:

1. The combination with a plurality of lengths of cable, of a single member floating between and wholly supported by adjacent lengths movable at an angle to the longitudinal axes of the said cables for equalizing the tension upon them.

2. The combination with a plurality of substantially parallel lengths of cable, of a circular member floating between adjacent lengths and wholly supported by engagement of each length with an edge thereof, adapted to be moved substantially transversely of the axes of said lengths in response to increased or decreased tension upon one of said lengths, whereby tension upon the adjacent length may be equalized with that upon said first length.

3. The combination with a plurality of substantially parallel lengths of cable, of a floating ring between adjacent lengths, adapted to equalize the tension upon them.

4. The combination with a plurality of substantially parallel lengths of cable, of a floating ring between adjacent lengths, adapted to move transversely of the axes of said lengths in response to increased or decreased tension upon one of them, whereby tension upon the adjacent length may be equalized with that upon said first length.

5. In a strain equalizer for cables and the like, the combination with a plurality of lengths of cable, of a plurality of spaced guides for said cable lengths; and a member floating between said guides engaging and wholly supported by adjacent lengths for equalizing the tension upon them.

6. In a strain equalizer for cables and the like, the combination with a plurality of substantially parallel lengths of cable, of a pair of spaced guides for said cable lengths; and a floating ring between said guides and between adjacent lengths for equalizing the tension upon the latter.

7. In a strain equalizer for cables and the like, the combination with a plurality of substantially parallel lengths of cable, of a pair of spaced guides for said cable lengths; and a ring member between adjacent lengths, movable transversely of the axes of said lengths between said guides, in response to increased or decreased tension upon one of said lengths, whereby tension upon the adjacent length may be equalized with that upon said first length.

8. A strain equalizer for parallel cables and the like, comprising a pair of relatively fixed spaced guides for said cables; and a member floatingly arranged between said guides to engage and be wholly supported by adjacent cables, and to be moved relative to said guides transversely of the longitudinal axes of said cables in response to increased or decreased tension upon one cable, whereby the tension upon the adjacent cable may be equalized with that upon said first cable.

9. A strain equalizer for parallel cables and the like, comprising a pair of spaced guides for said cables; and a floating ring adapted to be positioned between adjacent cables between said guides, and to be moved transversely of the longitudinal axes of said cables in response to increased or decreased tension upon one cable, whereby the tension upon the adjacent cable may be equalized with that upon said first cable.

In testimony whereof I affix my signature.

GEORGE K. VIALL.